US010894722B2

(12) United States Patent
Dodin et al.

(10) Patent No.: US 10,894,722 B2
(45) Date of Patent: Jan. 19, 2021

(54) PROCESS FOR PREPARING A NANOMETRIC ZEOLITE Y

(71) Applicant: IFP Energies Nouvelles, Rueil-Malmaison (FR)

(72) Inventors: Mathias Dodin, Oullins (FR); Nicolas Bats, Saint Symphorien d'Ozon (FR); Joel Patarin, Flaxlanden (FR); Jean Daou, Mulhouse (FR); Maeva Borel, Mulhouse (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 31 days.

(21) Appl. No.: 16/335,735

(22) PCT Filed: Sep. 18, 2017

(86) PCT No.: PCT/EP2017/073407
§ 371 (c)(1),
(2) Date: Mar. 22, 2019

(87) PCT Pub. No.: WO2018/054810
PCT Pub. Date: Mar. 29, 2018

(65) Prior Publication Data
US 2019/0248661 A1    Aug. 15, 2019

(30) Foreign Application Priority Data
Sep. 23, 2016    (FR) ..................................... 16 58970

(51) Int. Cl.
*C01B 39/24*    (2006.01)
*B01J 29/08*    (2006.01)
(Continued)

(52) U.S. Cl.
CPC ........... *C01B 39/205* (2013.01); *B01J 29/084* (2013.01); *B01J 35/1009* (2013.01); *C01B 39/20* (2013.01);
(Continued)

(58) Field of Classification Search
CPC ..... C01B 39/06; C01B 39/24; C01P 2004/64; C01P 2002/61; B01J 29/084
See application file for complete search history.

(56) References Cited

U.S. PATENT DOCUMENTS

2018/0009670 A1    1/2018    Dodin et al.
2019/0248661 A1*   8/2019    Dodin .................. C01B 39/205

FOREIGN PATENT DOCUMENTS

EP    0960854 A1    12/1999
WO    2016/110534 A1    7/2016

OTHER PUBLICATIONS

International Search Report dated Nov. 2, 2017 issued in corresponding PCT/EP2017/073407 application (3 pages).
(Continued)

*Primary Examiner* — David M Brunsman
(74) *Attorney, Agent, or Firm* — Millen White Zelano and Branigan, PC; Csaba Henter

(57) ABSTRACT

A process for preparing a nanometric zeolite Y of FAU structural type with a crystal size of less than 100 nm and an A/B ratio of greater than 2, by mixing, in aqueous medium, of at least one source $AO_2$ of at least one tetravalent element A chosen from silicon, germanium and titanium, of at least one source $BO_b$ of at least one trivalent element B chosen from aluminum, boron, iron, indium and gallium, of at least one source $C_{2/mO}$ of an alkali metal or alkaline-earth metal C chosen from lithium, sodium, potassium, calcium and magnesium, where source $C_{2/mO}$ also includes at least one
(Continued)

source of hydroxide ions, to obtain a gel, maturation and hydrothermal treatment of the gel.

16 Claims, 4 Drawing Sheets

(51) Int. Cl.
*C01B 39/20* (2006.01)
*B01J 35/10* (2006.01)
(52) U.S. Cl.
CPC .......... *C01B 39/24* (2013.01); *C01P 2002/01* (2013.01); *C01P 2002/30* (2013.01); *C01P 2002/60* (2013.01); *C01P 2002/72* (2013.01)

(56) References Cited

OTHER PUBLICATIONS

H. Awala et al., "Template-Free Nanosized Faujasite-Type Zeolites", Nature Materials, vol. 14, No. 4 (Apr. 2015) pp. 447-451.
H. Julide Koroglu et al., "Effects of Low-Temperature Gel Aging on the Synthesis of Zeolite Y at Different Alkalinities", Journal of Crystal Growth, vol. 241, No. 4 (2002) pp. 481-488.

* cited by examiner

PROCESS FOR PREPARING A NANOMETRIC ZEOLITE Y

This application is a 371 filing of PCT/EP2017/073407, filed Sep. 18, 2017.

TECHNICAL FIELD

The present invention relates to a novel process for preparing a zeolite Y of FAU structural type, the crystal size of which is less than 100 nm, which is referred to throughout the rest of the text as "nanometric zeolite", with an Si/Al structural ratio of greater than 2 and very good crystallinity, said process preferably being performed in the absence of organic structuring species, and being characterized by the addition, at a well-defined moment in the maturation step, of a source of a tetravalent element A (preferably A=Si). Said nanometric zeolite Y of FAU structural type advantageously finds its application as a catalyst, an adsorbent or separating agent.

PRIOR ART

Zeolites, or molecular sieves, are crystalline materials constituted of a three-dimensional arrangement of interconnected $TO_4$ tetrahedra (T may represent Si, Al, B, P, Ge, Ti, Ga or Fe, for example). The organization of the $TO_4$ elements gives rise to an ordered network of micropores constituted of channels and cavities, the dimensions of which are compatible with small-sized organic molecules. Depending on the manner in which the framework atoms are arranged, different zeolite structures are distinguished (there are at the present time more than 220 [http://www.iza-structure.org/databases]). Each structure thus has an intrinsic crystalline network which may be identified by its x-ray diffraction diagram.

Zeolites have numerous applications and concern fields such as catalysis, adsorption, ion exchange or purification. The use of a zeolite is conditioned by the characteristics of its porous network (dimensions, etc.) and its chemical composition. An aluminosilicate zeolite has a negatively charged framework, on account of the charge deficit provided by each aluminum atom relative to silicon, and which thus requires the presence of readily-exchangeable compensating cations ($Na^+$, $K^+$, etc.). When the latter are replaced, partially or totally, with ammonium cations $NH_4^+$, it is then possible to calcine the zeolite in order to obtain an acidic structure (the $NH_4^+$ are transformed into $H^+$ by elimination of $NH_3$). Such materials then find applications in acid catalysis, where their activity and their selectivity will depend on the strength of the acidic sites, their density and their localization, and also on their availability.

Among the main zeolites nowadays used are zeolites of FAU structural type, which are used in numerous industrial processes, for instance the catalytic cracking of heavy petroleum fractions. These zeolites exist in nature: faujasite was described for the first time in 1842 following its discovery in Germany [A. Damour, *Annales des Mines* 4 (1842) 395], but it was not until over a century later that it was obtained for the first time in the laboratory. In the synthetic state, two forms are distinguished: zeolite X with an Si/Al structural ratio of between 1 and 1.5 [R. M. Milton, U.S. Pat. No. 2,882,244, 1959] and zeolite Y for which the Si/Al ratio is greater than 1.5 [D. W. Breck, U.S. Pat. No. 3,130,007, 1964].

The face-centered cubic structure with 192 $TO_4$ tetrahedra (space group Fd-3m) of faujasite was solved in 1958 [G. Bergerhoff, W. H. Baur, W. Nowaki, *Neues Jahrb. Mineral. Monatsh.* 9 (1958) 193] and may be described as an assembly of sodalite cages, constituted of 24 tetrahedra, bonded together via 6-6 construction units ("6-membered double rings" or "d6r") in a symmetry of inversion center type. The lattice parameter a0 of faujasite may range between 24.2 and 24.8 Å depending on the framework Si/Al ratio [D. W. Breck, E. M. Flanigen, *Molecular Sieves*, Society of Chemical Industry, London (1968) 47; J. R. Sohn, S. J. DeCanio, J. H. Lunsford, D. J. O'Donnell, *Zeolites* 6 (1986) 225; H. Fichtner-Schmittler, U. Lohse, G. Engelhardt, V. Patzelova, *Cryst. Res. Technol.* 19 (1984)]. Inside the structure, the arrangement of the tetrahedra gives rise to supercages with a maximum diameter of 11.6 Å and acting as nanoreactors suitable for the cracking of hydrocarbons and the adsorption of gases; moreover, the pores of faujasite, with a diameter of 7.4 Å for 12 TO4 tetrahedra, allow good diffusion of molecules within the pore network [C. Baerlocher, L. B. McCusker, D. H. Olson, *Atlas of Zeolite Framework Type, 6th revised edition*, Elsevier (2007)].

One object of the present invention is to provide a process for preparing a zeolite Y of FAU structural type and having nanometric dimensions. Nanometric zeolites are of great interest in catalysis on account of their improved diffusion properties: in contrast with micrometric zeolites in which the length of the intracrystalline diffusion paths leads to restriction of the catalytic performance qualities [Y. Tao, H. Kanoh, L. Abrams, K. Kaneko, *Chem. Rev.* 106 (2006) 896] and gradual deactivation of the catalyst [K. Na, M. Choi, R. Ryoo, *Micro. Meso. Mater.* 166 (2013) 3], nanometric zeolites exhibit gains in activity and in selectivity [D. Karami, S. Rohani, *Petroleum Science and Technology* 31 (2013) 1625; Q. Cui, Y. Zhou, Q. Wei, X. Tao, G. Yu, Y. Wang, J. Yang, *Energy & Fuels* 26 (2012) 4664]. The present invention makes it possible to obtain a zeolite Y of FAU structural type, the crystals of which are less than 100 nm in size.

An essential aspect of the preparation process according to the invention is that of being able to obtain such a nanometric zeolite Y of FAU structural type simultaneously having a crystal size of less than 100 nm, a high A/B and preferably Si/Al ratio, in particular greater than 2, and also very good crystallinity, relative to the conventional processes of the prior art not making it possible to obtain a zeolite Y with a high A/B and preferably Si/Al ratio.

The crystallinity is defined in the present invention by a micropore volume of the zeolite, determined by nitrogen adsorption, of greater than 0.25 $cm^3/g$, preferably greater than 0.28 $cm^3/g$ and very preferably greater than 0.3 $cm^3/g$.

The term "micropores" means pores whose aperture is less than 2 nm.

The micropore volume is measured by nitrogen porosimetry. The quantitative analysis of the microporosity is performed using the "t" method (method of Lippens-De Boer, 1965), which corresponds to a transform of the starting adsorption isotherm, as described in the publication "Adsorption by powders and porous solids. Principles, methodology and applications", written by F. Rouquérol, J. Rouquérol and K. Sing, Academic Press, 1999.

SUMMARY OF THE INVENTION

One subject of the present invention is a process for preparing a nanometric zeolite Y of FAU structural type with a crystal size of less than 100 nm and an A/B and preferably Si/Al ratio of greater than 2, preferably greater than 2.3, preferably greater than 2.5 and very preferably greater than 2.6, said process comprising at least the following steps:

i) mixing, in aqueous medium, at least one source $AO_2$ of at least one tetravalent element A chosen from silicon, germanium and titanium, alone or as a mixture, at least one source $BO_b$ of at least one trivalent element B chosen from aluminum, boron, iron, indium and gallium, alone or as a mixture, at least one source $C_{2/m}O$ of an alkali metal or alkaline-earth metal C chosen from lithium, sodium, potassium, calcium and magnesium, alone or as a mixture, said source $C_{2/m}O$ of alkali metal or alkaline-earth metal C also including at least one source of hydroxide ions, to obtain a gel, the reaction mixture having the following molar composition:

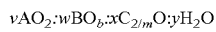
$vAO_2{:}wBO_b{:}xC_{2/m}O{:}yH_2O$ v being between 1 and 40, preferably between 1 and 20 and very preferably between 15 and 20, w being between 0.1 and 5 and preferably between 0.2 and 1.5, x being between 1 and 40 and preferably between 1 and 20, y being between 30 and 1000 and preferably between 100 and 400, b being between 1 and 3, b being an integer or rational number, m being equal to 1 or 2, ii) maturing the gel obtained on conclusion of step (i) at a temperature of between −15° C. and 60° C., preferably between 0° C. and 50° C. and very preferably between 20 and 40° C., with or without stirring, for a time of between 10 hours and 60 days, preferably between 10 hours and 30 days, very preferably between 1 day and 30 days, and even more preferably between 1 day and 20 days, iii) after at least 10 hours and less than 72 hours of maturation, single or repeated addition of at least one source $AO_2$ of at least one tetravalent element A chosen from silicon, germanium and titanium, alone or as a mixture, to said gel, the molar composition of the gel on conclusion of the addition being as follows:

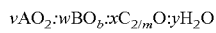
$vAO_2{:}wBO_b{:}xC_{2/m}O{:}yH_2O$ v being between 5 and 50, preferably between 10 and 35 and very preferably between 20 and 30, w being between 0.1 and 5 and preferably between 0.2 and 1.5, x being between 1 and 40 and preferably between 1 and 20, y being between 200 and 1000 and preferably between 200 and 500, b being between 1 and 3, b being an integer or rational number, m being equal to 1 or 2, iv) hydrothermal treatment of the gel obtained on conclusion of step (iii) at a temperature of between 20° C. and 200° C., preferably between 40° C. and 140° C., preferably between 50° C. and 100° C. and very preferably between 60 and 80° C., at the autogenous reaction pressure, for a time of between 1 hour and 14 days, preferably between 6 hours and 7 days, preferably between 10 hours and 3 days and very preferably between 16 hours and 24 hours, to obtain crystallization of said nanometric zeolite Y of FAU structural type.

The present invention thus makes it possible to obtain a zeolite Y of FAU structural type simultaneously having crystals less than 100 nm in size and an A/B and preferably Si/Al ratio of greater than 2 by means of performing a maturation step in which a source of a tetravalent element A chosen from silicon, germanium and titanium, alone or as a mixture, is added.

The process according to the invention also makes it possible to obtain zeolite crystals of FAU structural type, with an A/B and preferably Si/Al ratio of greater than 2, less than 100 nm in size, and the crystallinity of which is improved relative to the prior art. This is reflected by a micropore volume of the zeolite, determined by nitrogen adsorption, of greater than 0.25 cm³/g, preferably greater than 0.28 cm³/g and very preferably greater than 0.3 cm³/g.

DESCRIPTION OF THE INVENTION

In accordance with the invention, at least one source $AO_2$ of at least one tetravalent element A is incorporated into step (i) of the preparation process. According to the invention, A is chosen from silicon, germanium and titanium, and a mixture of at least two of these tetravalent elements, and very preferentially A is silicon. The source(s) of said tetravalent element(s) A may be any compound comprising the element A and which can release this element in aqueous solution in reactive form. Element A is incorporated into the mixture in an oxidized form $AO_2$ or in another form. When A is titanium, $Ti(EtO)_4$ is advantageously used as source of titanium. When A is germanium, amorphous $GeO_2$ is advantageously used as source of germanium. In the preferred case in which A is silicon, the source of silicon may be any one of said sources commonly used for zeolite synthesis, for example powdered silica, silicic acid, colloidal silica, dissolved silica or tetraethoxysilane (TEOS). Among the powdered silicas, use may be made of precipitated silicas, especially those obtained by precipitation from a solution of alkali metal silicate, fumed silicas, for example Cab-O-Sil, and silica gels. Colloidal silicas having various particle sizes, for example a mean equivalent diameter of between 10 and 15 nm or between 40 and 50 nm may be used, such as those sold under registered brand names such as Ludox. Preferably, the source of silicon is Ludox.

In accordance with the invention, at least one source $C_{2/m}O$ of an alkali metal or alkaline-earth metal C is incorporated into step (i) of the preparation process. According to the invention, C is one or more alkali metals and/or alkaline-earth metals preferably chosen from lithium, sodium, potassium, calcium and magnesium, and a mixture of at least two of these metals, and very preferably C is sodium. The source(s) $C_{2/m}O$ of said alkali metal or alkaline-earth metal C may be any compound comprising the element C and which can release this element in aqueous solution in reactive form.

In accordance with the invention, said source $C_{2/m}O$ of alkali metal or alkaline-earth metal C may also release at least one source of hydroxide ions in aqueous solution.

Preferably, the source $C_{2/m}O$ of an alkali metal or alkaline-earth metal C also including at least one source of hydroxide ions is chosen from lithium hydroxide, sodium hydroxide, potassium hydroxide, calcium hydroxide and magnesium hydroxide, alone or as a mixture.

In accordance with the invention, at least one source $BO_b$ of at least one trivalent element B is added in the mixing step (i) of the preparation process. According to the invention, said trivalent element B is chosen from aluminum, boron, iron, indium and gallium, or a mixture of at least two of these trivalent elements, and very preferentially B is aluminum. The source(s) of said trivalent element(s) B may be any compound comprising the element B and which can release this element in aqueous solution in reactive form. Element B may be incorporated into the mixture in an oxidized form $BO_b$ with $1 \leq b \leq 3$ (b being an integer or a rational number) or in any other form. In the preferred case in which B is aluminum, the source of aluminum is preferably sodium aluminate or an aluminum salt, for example the chloride, nitrate, hydroxide or sulfate, an aluminum alkoxide or alumina itself, preferably in hydrated or hydratable form, for instance colloidal alumina, pseudoboehmite, gamma-alumina or alpha or beta alumina trihydrate. Use may also be made of mixtures of the sources mentioned above.

In accordance with the invention, the various sources are added in the mixing step (i) so that the reaction mixture has the following molar composition:

$$vAO_2 : wBO_b : xC_{2/m}O : yH_2O$$

v being between 1 and 40, preferably between 1 and 20 and very preferably between 15 and 20, w being between 0.1 and 5 and preferably between 0.2 and 1.5, x being between 1 and 40 and preferably between 1 and 20, y being between 30 and 1000 and preferably between 100 and 400, b being between 1 and 3, b being an integer or rational number, m being equal to 1 or 2, in which A, B and C have the same definition as previously, namely A is one or more tetravalent elements chosen from the group formed by the following elements: silicon, germanium and titanium, and very preferably A is silicon, in which B is one or more trivalent elements chosen from the group formed by the following elements: aluminum, iron, boron, indium and gallium, and very preferably B is aluminum, in which C is one or more alkali metals and/or alkaline-earth metals chosen from lithium, sodium, potassium, calcium and magnesium, and a mixture of at least two of these metals, and very preferably C is sodium.

Preferably, said mixing step (i) is performed in the absence of organic structuring agent.

Step (i) of the process according to the invention consists in preparing an aqueous reaction mixture referred to as a gel and containing at least one source $AO_2$ of at least one tetravalent element A, at least one source $BO_b$ of at least one trivalent element B, B preferably being aluminum, at least one source $C_{2/m}O$ of at least one alkali metal or alkaline-earth metal C, C preferably being sodium. The amounts of said reagents are adjusted so as to give this gel a composition allowing its crystallization as a nanometric zeolite Y of FAU structural type.

It may be advantageous to add seeds to the reaction mixture during said step (i) of the process of the invention so as to reduce the time required for the formation of the nanometric zeolite Y crystals of FAU structural type and/or the total crystallization time. Said seeds also promote the formation of said zeolite Y of FAU structural type to the detriment of impurities. Such seeds comprise crystallized solids, preferably crystals of zeolite of FAU structural type. The crystalline seeds are generally added in a proportion of between 0.01% and 10% of the mass of the source of element A, preferably of the oxide $AO_2$, used in the reaction mixture.

Step (ii) of the process according to the invention consists in performing maturation of the gel obtained on conclusion of the mixing step (i). Said maturation step may be performed with or without stirring, under static conditions. In the case where said step is performed with stirring, it is preferably performed with magnetic or mechanical stirring, with a stirring speed of between 0 and 1000 rpm. Said maturation step advantageously takes place at a temperature of between −15° C. and 60° C., preferably between 00° C. and 50° C. and very preferably between 20 and 40° C., for a time of between 10 hours and 60 days, preferably between 10 hours and 30 days, very preferably between 1 day and 30 days, and even more preferably between 1 day and 20 days.

In accordance with step (iii) of the process according to the invention, after at least 10 hours and less than 72 hours of maturation, preferably after at least 10 hours and strictly less than 72 hours, preferably after at least 12 hours and less than 48 hours and very preferably after at least 24 hours and less than 48 hours, at least one source $AO_2$ of at least one tetravalent element A chosen from silicon, germanium and titanium, alone or as a mixture, is added to the gel obtained on conclusion of the mixing step (i).

The addition of at least said source $AO_2$ thus takes place during the maturation step (ii), at a quite specific moment in said maturation step. Maturation thus continues after the addition for a time of between 10 hours and 60 days, preferably between 10 hours and 30 days, very preferably between 1 day and 30 days and even more preferably between 1 day and 20 days.

The addition of at least one source $AO_2$ of at least one tetravalent element A may advantageously be repeated one or more times, with an identical or different amount. Said repeated additions may advantageously be spaced apart by a time of between 5 minutes and 1 day and preferably between 6 and 12 hours. A has the same definition as previously, namely A is one or more tetravalent elements chosen from the group formed by the following elements: silicon, germanium, titanium, and very preferably A is silicon. The source(s) of said tetravalent element(s) A may be any compound comprising the element A and which can release this element in aqueous solution in reactive form. Element A may be incorporated into the mixture in an oxidized form $AO_2$ or in another form.

Preferably, the tetravalent element A added in the maturation step (iii) of the process according to the invention may be identical to or different from the tetravalent element A added in the mixing step (i), and is preferably identical.

In the preferred case in which A is silicon, the source of silicon may be any one of said sources commonly used for zeolite synthesis and described in the mixing step (i).

Preferably, no other source of constituent element of the reaction mixture other than $AO_2$ is added in said step (iii) of the process according to the invention.

On conclusion of the addition in accordance with step (iii), the molar composition of the gel is as follows:

$$vAO_2 : wBO_b : xC_{2/m}O : yH_2O$$

v being between 5 and 50, preferably between 10 and 35 and very preferably between 20 and 30, w being between 0.1 and 5 and preferably between 0.2 and 1.5, x being between 1 and 40 and preferably between 1 and 20, y being between 200 and 1000 and preferably between 200 and 500, b being between 1 and 3, b being an integer or rational number, m being equal to 1 or 2.

In accordance with step (iv) of the process according to the invention, the gel obtained on conclusion of step (iii) of addition of at least one tetravalent element A is subjected to a hydrothermal treatment, performed at a temperature of between 20° C. and 200° C., preferably between 40° C. and 140° C., preferably between 50° C. and 100° C. and very preferably between 60 and 80° C., at the autogenous reaction pressure, for a time of between 1 hour and 14 days, preferably between 6 hours and 7 days, preferably between 10 hours and 3 days and very preferably between 16 hours and 24 hours, to obtain crystallization of said nanometric zeolite Y of FAU structural type. The gel is advantageously placed under hydrothermal conditions at an autogenous reaction pressure, optionally by adding gas, for example nitrogen. Step (iv) of the preparation process according to the invention is performed under static conditions or with stirring.

At the end of the reaction, when said nanometric zeolite Y of FAU structural type is formed following the implementation of said step (iv) of the preparation process of the invention, the solid phase formed from the nanometric zeolite Y of FAU structural type is advantageously filtered off, washed and then dried. The drying is preferably performed at a temperature of between 20° C. and 150° C., preferably between 70° C. and 120° C., for a time of between 5 and 20 hours. The dried nanometric zeolite Y of FAU structural type is generally analyzed by x-ray diffraction, this technique also making it possible to determine the purity of said zeolite obtained via the process of the invention. Very advantageously, the process of the invention leads to the formation of a pure nanometric zeolite Y of FAU structural type, in the absence of any other crystalline or amorphous phase. Said nanometric zeolite Y of FAU structural type, obtained on conclusion of step (iv) and optionally dried, is referred to as crude synthetic zeolite.

On conclusion of the drying step, said crude synthetic zeolite optionally undergoes at least one calcination step and at least one ion-exchange step. For these steps, any conventional method known to those skilled in the art may be employed.

The calcination of the crude synthetic nanometric zeolite Y of FAU structural type obtained according to the process of the invention is preferably performed at a temperature of between 500 and 700° C. and for a time of between 5 and 15 hours.

The preparation process according to the invention allows the production of a zeolite Y having a crystal size of less than 100 nm, preferably less than 60 nm and preferably less than 50 nm, and an A/B and preferably Si/Al ratio of greater than 2, preferably greater than 2.3, preferably greater than 2.5 and very preferably greater than 2.6. The size of the zeolite crystals obtained is measured on one or more transmission electron microscopy images; it is the maximum size observed in the images.

As a general rule, the cation(s) C of the nanometric zeolite Y of FAU structural type obtained via the process of the invention may be replaced with any one or more cations of metals and in particular those of groups IA, IB, IIA, IIB, IIA, IIIB (including the rare-earth metals), VIII (including the noble metals) and also with lead, tin and bismuth via an ion-exchange step. Said ion-exchange step is performed using any water-soluble salts containing the appropriate cation.

It is also advantageous to obtain the hydrogen form of the nanometric zeolite Y of FAU structural type obtained via the preparation process according to the invention. Said hydrogen form may be obtained by performing an ion exchange with an acid, in particular a strong mineral acid such as hydrochloric, sulfuric or nitric acid, or with a compound such as ammonium chloride, sulfate or nitrate. Said ion-exchange step may advantageously be performed by placing said nanometric zeolite Y of FAU structural type in suspension one or more times with the ion-exchange solution. Said zeolite may be calcined before or after the ion-exchange step or between two ion-exchange steps. Calcination of said zeolite after the ion-exchange step(s) makes it possible to obtain the acid form thereof. Said acid form of the nanometric zeolite may advantageously be used for catalysis applications.

The structure of said material is identified by x-ray diffractometry, in the diffraction angle domain 2θ=5° to 40°±0.02°, in reflection geometry. The source of x-rays is a copper anticathode powered with a voltage of 40 kV and a current of 40 mA, and supplying a monochromatic radiation Cu-Kα1 ($\lambda$=1.5406 Å). Said zeolite Y of FAU structural type obtained via the process according to the invention advantageously has an x-ray diffraction diagram including at least the lines given in the table corresponding to the zeolite x-ray diffraction diagram below:

| Interreticular distance (Å) | Intensity (%) |
|---|---|
| 14.11 | S |
| 8.68 | w |
| 7.40 | w |
| 5.63 | m |
| 4.72 | w |
| 4.35 | mw |
| 3.87 | w |
| 3.75 | VS |
| 3.44 | vw |
| 3.29 | S |
| 3.01 | mw |
| 2.89 | m |
| 2.85 | VS |
| 2.75 | mw |
| 2.62 | w |
| 2.37 | w |
| 2.18 | w |
| 2.09 | vw |

VS = very strong;
S = strong;
m = medium;
mw = moderately weak;
w = weak;
vw = very weak The relative intensity $I/I_0$ is given as a relative intensity scale in which a value of 100 is attributed to the most intense line in the x-ray diffraction diagram: vw<15; 15≤w<30; 30≤mw<50; 50≤m<65; 65≤S<85; VS≥85.

The zeolite obtained via the process of the invention may be used after ion exchange as acidic solid for catalysis, i.e. as catalyst in the fields of refining and petrochemistry. It may also be used as an adsorbent for pollution control or as molecular sieves for separation.

For example, when it is used as catalyst, the zeolite prepared according to the process of the invention is calcined, exchanged and is preferably in hydrogen form, and may be combined with an inorganic matrix, which may be inert or catalytically active, and with a metallic phase. The inorganic matrix may be present simply as binder for keeping together the small zeolite particles in the various forms known for catalysts (extrudates, pellets, beads or powders), or may be added as diluent to impose the degree of conversion in a process which would otherwise proceed too quickly, leading to fouling of the catalyst as a result of substantial coke formation. Typical inorganic matrices are especially catalyst support materials such as silica, the various forms of alumina, magnesia, zirconia, titanium, boron or zirconium oxides, aluminum or titanium phosphates, kaolin clays, bentonites, montmorillonites, sepiolite, attapulgite, fuller's earth, porous synthetic materials such as $SiO_2$—$Al_2O_3$, $SiO_2$—$ZrO_2$, $SiO_2$—$ThO_2$, $SiO_2$—$BeO$, $SiO_2$—$TiO_2$, or any combination of these compounds. The inorganic matrix may be a mixture of various compounds, in particular of an inert phase and of an active phase.

The zeolite prepared according to the process of the invention may also be combined with at least one other zeolite and may act as main active phase or as additive.

The metallic phase is introduced into the zeolite alone, the inorganic matrix alone or the inorganic matrix-zeolite combination by ion exchange or impregnation with cations or oxides chosen from the following elements: Cu, Ag, Ga, Mg, Ca, Sr, Zn, Cd, B, Al, Sn, Pb, V, P, Sb, Cr, Mo, W, Mn, Re, Fe, Co, Ni, Pt, Pd, Ru, Rh, Os, Ir and any other element of the Periodic Table of the Elements.

The metals may be introduced either all in the same manner, or via different techniques, at any moment in the preparation, before or after forming and in any order. Furthermore, intermediate treatments, for instance calcination and/or reduction, may be applied between the depositions of the various metals.

The catalytic compositions including the nanometric zeolite Y of FAU structural type prepared according to the process of the invention are generally suitable for performing the main hydrocarbon transformation processes and reactions for the synthesis of organic compounds such as ethers.

Any forming method known to a person skilled in the art is suitable for the catalyst including the nanometric zeolite Y of FAU structural type. Use may be made, for example, of pelletizing or extrusion or of forming into beads. The forming of the catalyst containing the zeolite prepared according to the process of the invention and being at least partly in acidic form is generally such that the catalyst is preferably in the form of extrudates or beads for the purpose of its use.

EXAMPLES

The invention is illustrated by the examples that follow, which are not in any way limiting in nature.

Example 1

Preparation of a nanometric zeolite X of FAU structural type and with an Si/Al mole ratio equal to 1.4 according to a process not in accordance with the invention in the sense that no source of silicon or of any other tetravalent element is added during the maturation step.

A nanometric zeolite X of FAU structural type containing the elements Si and Al, with an Si/Al mole ratio equal to 1.4, is synthesized according to a preparation method known to those skilled in the art. Typically, the source of aluminum (sodium aluminate, Strem Chemicals, 99%) and the mineralizing agent (sodium hydroxide, Fluka, 99%) are dissolved in deionized water, with stirring. The source of silicon (Ludox AS-40, 40%, Sigma-Aldrich) is then added dropwise, so as to obtain a reaction mixture whose molar composition is 15.2 $SiO_2$: 1 $Al_2O_3$: 17 $Na_2O$: 360 $H_2O$.

The reaction mixture is maintained under vigorous stirring for 17 days at room temperature. The product is then filtered off and washed, before being oven-dried overnight at 100° C. No source of silicon or of any other tetravalent element is added during the maturation step.

Figure 1:
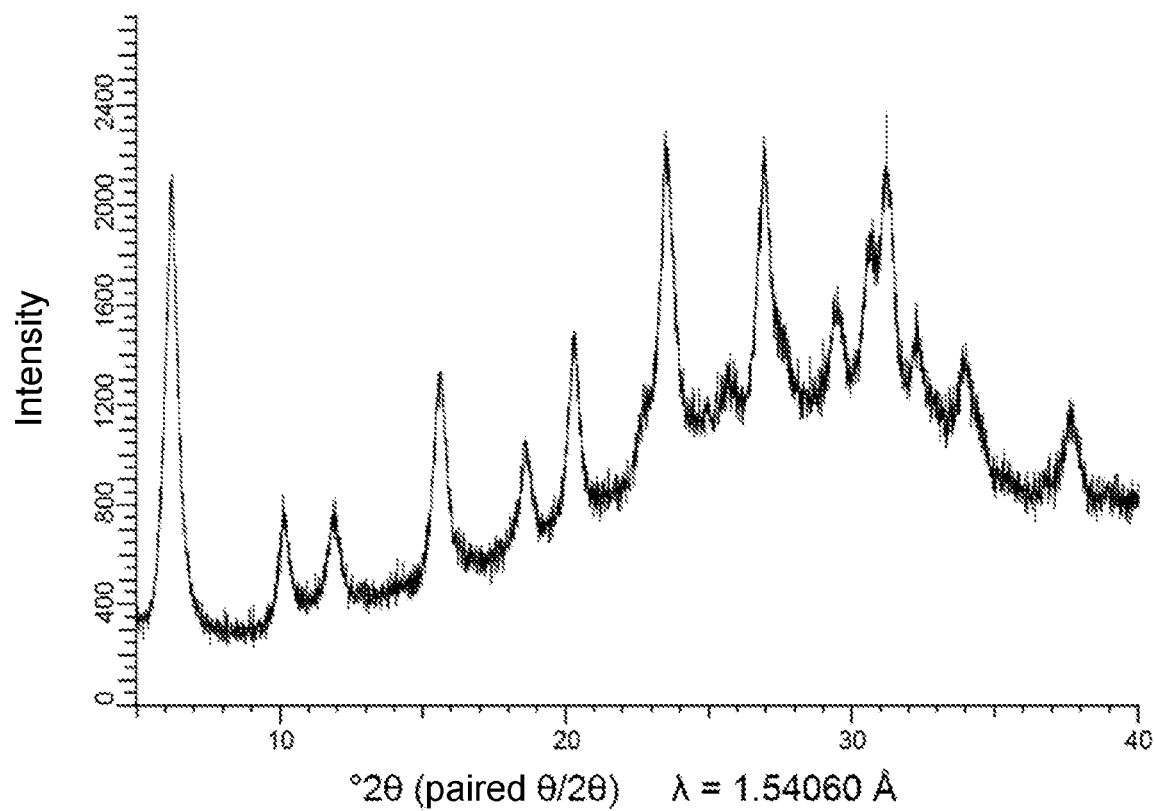
FIGS. 1 and 2 represent the x-ray diffraction diagrams of the nanometric zeolites X and Y of FAU structural type synthesized, respectively, in examples 1 and 2, in the diffraction angle domain 2θ=5° to 40°.

The x-ray diffraction diagram of the material shown in FIG. 1 is indexable in the cubic system of zeolite of FAU structural type. Analysis of the x-ray diffractogram gives an Si/Al mole ratio equal to 1.4 according to the Fichtner-Schmittler equation. These characteristics correspond to a zeolite X of FAU structural type. The size of the zeolite crystals obtained, measured on eight transmission electron microscopy images, is between 15 and 50 nm.

The process according to example 1 not comprising any step of adding a source of silicon or of any other tetravalent element during the maturation step thus does not make it possible to obtain a zeolite Y with an Si/Al ratio>2, but a zeolite X with an Si/Al ratio=1.4.

Example 2

Preparation of the nanometric zeolite Y of FAU structural type and with an Si/Al mole ratio equal to 2.7 according to a process not in accordance with the invention in the sense that the addition of a source of silicon is performed after 7 days of maturation.

A nanometric zeolite Y of FAU structural type containing the elements Si and Al, with an Si/Al mole ratio equal to 2.7, is synthesized according to a preparation method described in example 1 as regards the mixing step (i). Typically, the source of aluminum (sodium aluminate, Strem Chemicals, 99%) and the mineralizing agent (sodium hydroxide, Fluka, 99%) are dissolved in deionized water, with stirring. The source of silicon (Ludox AS-40, 40%, Sigma-Aldrich) is then added dropwise, so as to obtain a reaction mixture whose molar composition is 15.2 $SiO_2$: 1 $Al_2O_3$: 17 $Na_2O$: 360 $H_2O$. The gel thus formed is placed under vigorous stirring at room temperature. After seven days of maturation, a source of silicon (Ludox AS-40, 40%, Sigma-Aldrich) is added dropwise. The operation is repeated the following day and the day after that. After the three additions of source of silicon, the gel thus formed has the following composition: 25 $SiO_2$: 1 $Al_2O_3$: 18.4 $Na_2O$: 480 $H_2O$. The reaction mixture is maintained under vigorous stirring for a further four days at room temperature, and is then transferred into a polypropylene flask. This flask is placed in an oven at 60° C. for 24 hours at the autogenous pressure and without addition of gas.

After cooling the flask to room temperature, the product is filtered off and washed, and then dried in an oven overnight at 100° C.

Figure 2:
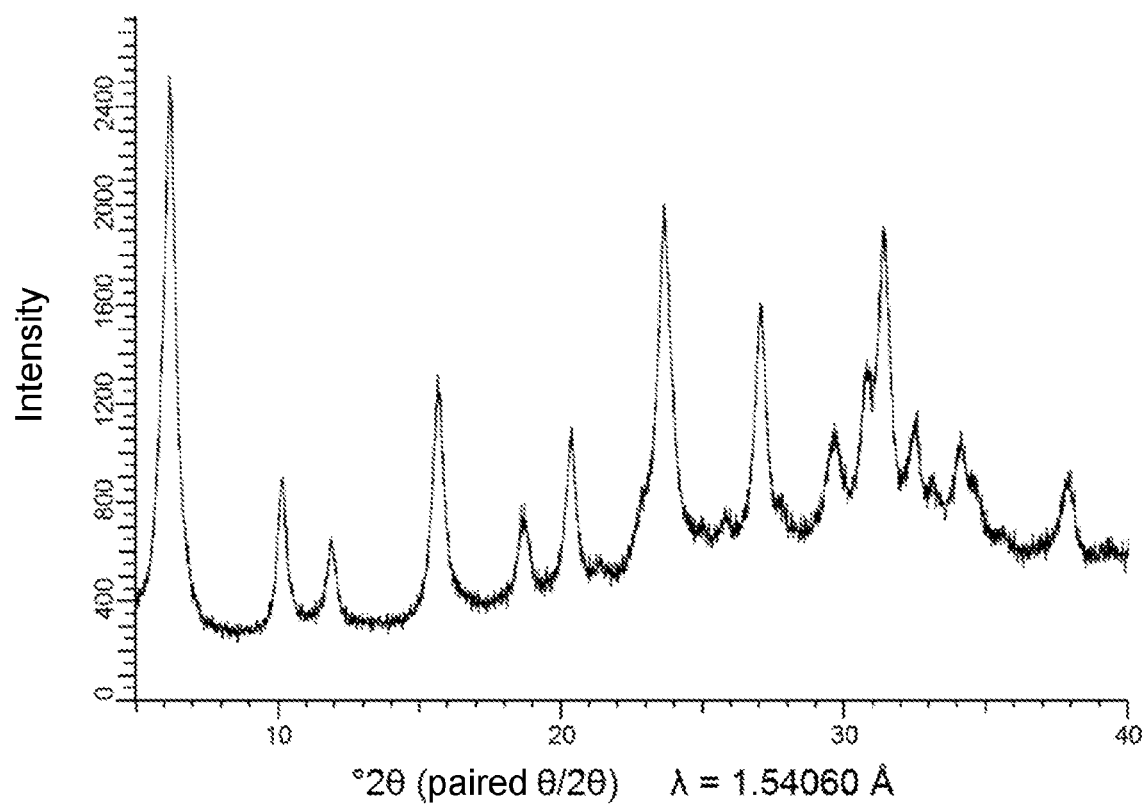
Figure 3:
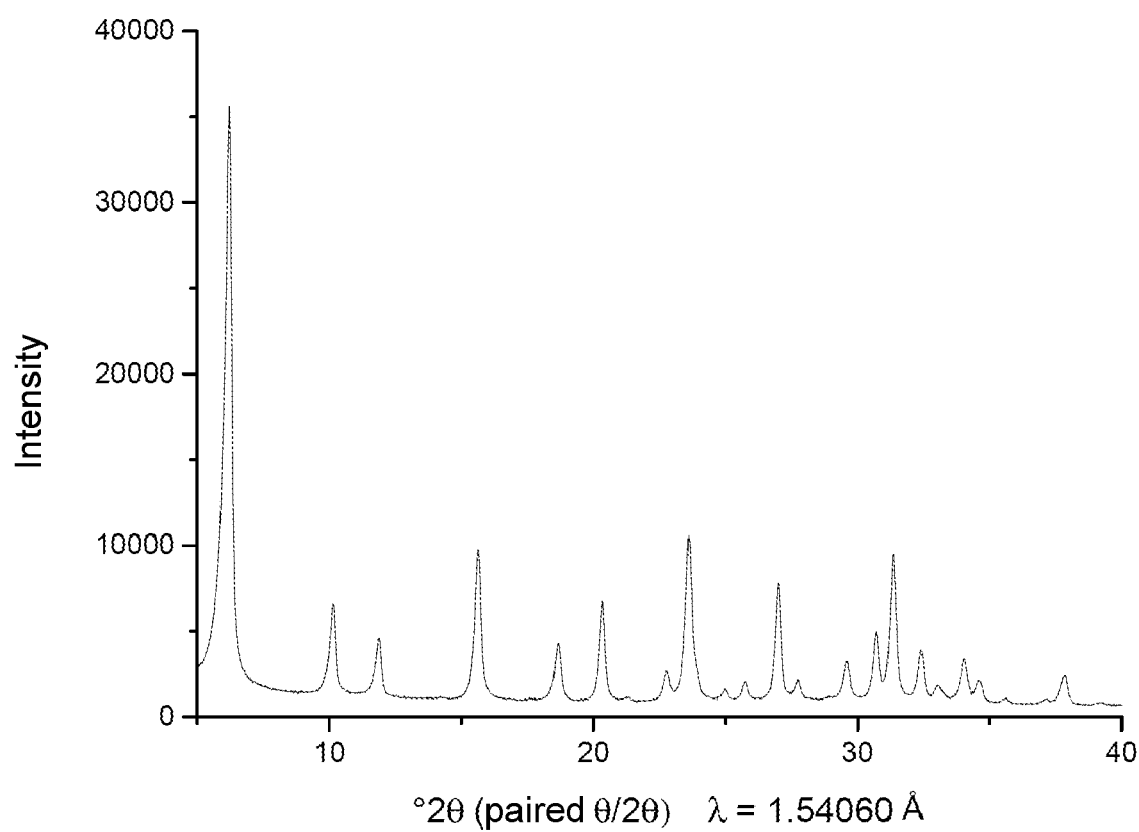
FIG. 3 represents the x-ray diffraction diagram of the nanometric zeolite Y of FAU structural type synthesized in example 3 according to the invention, in the diffraction angle domain 2theta=3° to 50°.
Figure 4:
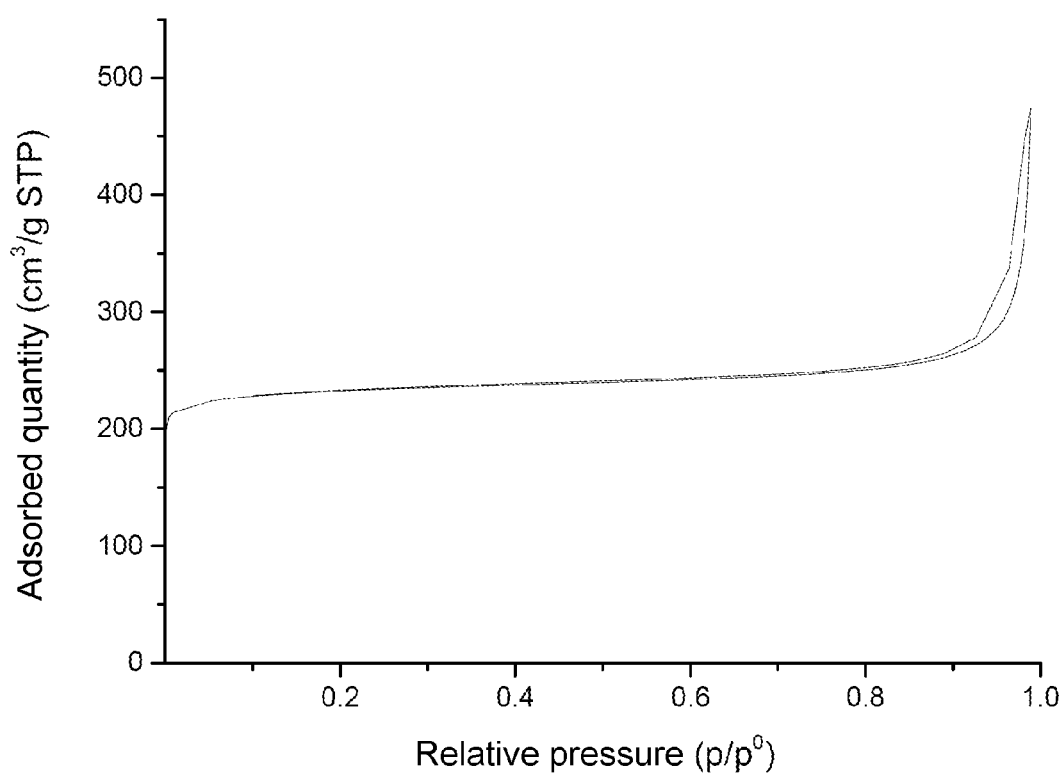
FIG. 4 represents the dinitrogen adsorption-desorption isotherm for the zeolite Y of FAU structural type synthesized in example 3 according to the invention.

The x-ray diffraction diagram of the material shown in FIG. 2 is indexable in the cubic system of zeolite of FAU structural type. Analysis of the x-ray diffractogram gives an Si/Al mole ratio equal to 2.7 according to the Fichtner-Schmittler equation. These characteristics also correspond to a zeolite Y of FAU structural type. The size of the zeolite crystals obtained, measured on eight transmission electron microscopy images, is between 15 and 50 nm.

However, the micropore volume of the zeolite Y obtained according to example 2 determined by nitrogen adsorption is equal to 0.24 cm³/g.

Example 3

Preparation of the nanometric zeolite Y of FAU structural type and with an Si/Al mole ratio equal to 2.4 according to a process in accordance with the invention in the sense that the addition of a source of silicon is performed after 1 day of maturation.

A nanometric zeolite Y of FAU structural type containing the elements Si and Al, with an Si/Al mole ratio equal to 2.4, is synthesized according to the following preparation method. The source of aluminum (sodium aluminate, Sigma-Aldrich, 53% $Al_2O_3$, 43% $Na_2O$, 4% $H_2O$) and the mineralizing agent (sodium hydroxide, Carlo Erba, 99%) are dissolved in deionized water, with stirring. The source of silicon (Ludox AS-40, 40%, Sigma-Aldrich) is then added dropwise, so as to obtain a reaction mixture whose molar composition is 15 $SiO_2$: 1 $Al_2O_3$: 17 $Na_2O$: 360 $H_2O$. The gel thus formed is stirred at room temperature. After one day of maturation, a source of silicon (Aerosil 130V, Evonik, >99.8%) is added. After this addition of source of silicon, the gel thus formed has the following composition: 36 $SiO_2$: 1 $Al_2O_3$: 17 $Na_2O$: 360 $H_2O$. The reaction mixture is kept stirring for a further six days at room temperature, and is then transferred into a polypropylene flask. This flask is placed in an oven at 70° C. for 16 hours at the autogenous pressure and without addition of gas. After cooling the flask to room temperature, the product is washed by centrifugation, and then dried in an oven overnight at 100° C.

The x-ray diffractogram of the material shown in FIG. 1 is indexable in the cubic system of zeolite of FAU structural type. Analysis of the x-ray diffractogram gives an Si/Al mole ratio equal to 2.4 according to the Breck-Flanigen equation. The mean size of the zeolite crystals obtained, measured by transmission electron microscopy on a total of 100 particles, is about 90 nm.

Moreover, the zeolite Y obtained according to example 3 according to the invention has very good crystallinity. Specifically, the dinitrogen adsorption-desorption isotherm shown in FIG. 2 makes it possible to deduce that the micropore volume of the zeolite is equal to 0.34 cm³/g.

Example 4: Not in Accordance with the Invention

According to a process not in accordance with the invention, a gel identical in composition to that described in example 3 after the addition of the source of silicon is prepared from the first mixing step: 36 $SiO_2$: 1 $Al_2O_3$: 17 $Na_2O$: 360 $H_2O$. This gel is stirred at room temperature for 7 days, corresponding to the total maturation time of the gel prepared in example 3. The reaction mixture is then transferred into a polypropylene flask. This flask is placed in an oven at 70° C. for 16 hours at the autogenous pressure and without addition of gas. After cooling the flask to room temperature, the product is washed by centrifugation, and then dried in an oven overnight at 100° C.

The x-ray diffractogram of the material obtained shows that no crystalline product is formed on conclusion of the crystallization step at 70° C.

The preparation process described in this example thus does not make it possible to obtain a nanometric zeolite of FAU structural type.

The invention claimed is:

1. A process for preparing a nanometric zeolite Y of FAU structural type with a crystal size of less than 100 nm and an A/B ratio of greater than 2, said process comprising:
    i) mixing, in an aqueous medium, at least one source $AO_2$ of at least one tetravalent element A chosen from silicon, germanium and titanium, alone or as a mixture, at least one source $BO_b$ of at least one trivalent element B chosen from aluminum, boron, iron, indium and gallium, alone or as a mixture, at least one source $C_{2/m}O$ of an alkali metal or alkaline-earth metal C chosen from lithium, sodium, potassium, calcium and magnesium, alone or as a mixture, said source $C_{2/m}O$ of alkali metal or alkaline-earth metal C also including at least one source of hydroxide ions, to obtain a gel, the reaction mixture having the following molar composition:

$vAO_2$:$wBO_b$:$xC_{2/m}O$:$yH_2O$ v being 1 to 40,
    w being 0.1 to 5,
    x being 1 to 40,
    y being 30 to 1000,
    b being 1 to 3, b being an integer or rational number, and
    m being equal to 1 or 2,
    ii) maturing the gel obtained from step (i) at a temperature of −15° C. to 60° C., with or without stirring, for a time of 10 hours to 60 days,
    iii) after at least 10 hours and less than 48 hours of maturation, single or repeated addition of at least one source $AO_2$ of at least one tetravalent element A chosen from silicon, germanium and titanium, alone or as a mixture, to said gel, the molar composition of the gel on conclusion of the addition being as follows:

$vAO_2$:$wBO_b$:$xC_{2/m}O$:$yH_2O$ v being 5 to 50,
    w being 0.1 to 5,
    x being 1 to 40,
    y being 200 to 1000,
    b being 1 to 3, b being an integer or rational number, and
    m being equal to 1 or 2,
    iv) hydrothermal treatment of the gel obtained from step (iii) at a temperature of 20° C. to 200° C., at an autogenous reaction pressure, for a time of 1 hour to 14 days, to obtain crystallization of said nanometric zeolite Y of FAU structural type.

2. The process as claimed in claim 1, in which A is silicon.
3. The process as claimed in claim 1, in which B is aluminum.
4. The process as claimed in claim 1, in which C is sodium.
5. The process as claimed in claim 1, in which the reaction mixture from the mixing step (i) has the following molar composition:

$vAO_2$:$wBO_b$:$xC_{2/m}O$:$yH_2O$ v being 15 to 20,
    w being 0.2 to 1.5,
    x being 1 to 20,
    y being 100 to 400,
    b being 1 to 3, b being an integer or rational number,
    m being equal to 1 or 2.
6. The process as claimed in claim 1, in which seeds comprising crystals of zeolite of FAU structural type are added during the mixing step (i).

7. The process as claimed in claim 1, in which said mixing step (i) is performed in the absence of an organic structuring agent.

8. The process as claimed in claim 1, in which said maturation step (ii) takes place at a temperature of 20 to 40° C., for a time of 10 hours to 30 days.

9. The process as claimed in claim 1, in which the tetravalent element A added in the maturation step (iii) is identical to the tetravalent element A added in the mixing step (i).

10. The process as claimed in claim 1, in which the single or repeated addition in said step (iii) of at least one source of at least one tetravalent element A is performed after at least 24 hours and less than 48 hours.

11. The process as claimed in claim 1, in which the single or repeated addition in said step (iii) of at least one source of at least one tetravalent element A is performed after at least 12 hours and less than 48 hours.

12. The process as claimed in claim 1, in which the molar composition of the gel on conclusion of the addition in step (iii) is as follows:

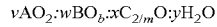

$vAO_2{:}wBO_b{:}xC_{2/m}O{:}yH_2O$ v being 20 to 30,
w being 0.2 to 1.5,
x being 1 to 20,
y being 200 to 500,
b being 1 to 3, b being an integer or rational number,
m being equal to 1 or 2.

13. The process as claimed in claim 1, in which the nanometric zeolite Y of FAU structural type formed on conclusion of step (iv) is filtered off, washed and then dried at a temperature of 20° C. to 150° C.

14. The process as claimed in claim 13, in which said zeolite obtained on conclusion of the drying step undergoes at least one calcination step and at least one ion-exchange step.

15. The process as claimed in claim 1, in which the tetravalent element A added in the maturation step (iii) is different from the tetravalent element A added in the mixing step (i).

16. The process as claimed in claim 1, in which the single addition in said step (iii) of at least one source of at least one tetravalent element A is performed at 24 hours.

* * * * *